(12) United States Patent
Liu et al.

(10) Patent No.: US 12,366,504 B2
(45) Date of Patent: Jul. 22, 2025

(54) ROLLING BEARING COMBINED FAULT DIAGNOSIS METHOD BASED ON MULTI-DOMAIN FEATURE CONSTRUCTION

(71) Applicant: Guangdong Ocean University, Zhanjiang (CN)

(72) Inventors: Qiang Liu, Zhanjiang (CN); Guoyan Yu, Zhanjiang (CN); Jiawei Zhang, Zhanjiang (CN); Bo Wen, Zhanjiang (CN); Xiaoming Xu, Zhanjiang (CN); Zheng Liu, Zhanjiang (CN); Donglin Hou, Zhanjiang (CN); Jiale Liao, Zhanjiang (CN)

(73) Assignee: Guangdong Ocean University, Zhanjiang (CN)

( * ) Notice: Subject to any disclaimer, the term of this patent is extended or adjusted under 35 U.S.C. 154(b) by 0 days.

(21) Appl. No.: 19/007,506

(22) Filed: Jan. 1, 2025

(65) Prior Publication Data

US 2025/0137881 A1    May 1, 2025

Related U.S. Application Data

(63) Continuation of application No. PCT/CN2024/073317, filed on Jan. 19, 2024.

(30) Foreign Application Priority Data

Apr. 20, 2023   (CN) .......................... 202310426113.7

(51) Int. Cl.
G01M 13/045    (2019.01)
(52) U.S. Cl.
CPC ................................ G01M 13/045 (2013.01)

(58) Field of Classification Search
CPC .................................................. G01M 13/045
See application file for complete search history.

(56) References Cited

U.S. PATENT DOCUMENTS

| | | | |
|---|---|---|---|
| 2011/0208678 A1* | 8/2011 | Bougaev | G01P 15/00 |
| | | | 706/54 |
| 2014/0039809 A1 | 2/2014 | Girondin et al. | |
| 2016/0120429 A1 | 5/2016 | Lo et al. | |

FOREIGN PATENT DOCUMENTS

| | | |
|---|---|---|
| AU | 2020103681 A | 2/2021 |
| CN | 105424366 A | 3/2016 |

(Continued)

OTHER PUBLICATIONS

The first search report dated Nov. 20, 2023 in SIPO application No. 202310426113.7.

(Continued)

*Primary Examiner* — Lisa M Caputo
*Assistant Examiner* — Cynthia L Davis
(74) *Attorney, Agent, or Firm* — Piloff Passino & Cosenza LLP; Rachel K. Piloff; Sean A. Passino

(57) ABSTRACT

A rolling bearing combined fault diagnosis method based on a multi-domain feature construction is provided, including: collecting vibration signals of rolling bearings, extracting time-domain and frequency-domain features of fault-sensitive vibration signals of the rolling bearings, and obtaining an in-domain feature set; performing an improved empirical mode decomposition on the vibration signals of the rolling bearings to obtain time-frequency features; constructing a multi-domain fault sample set based on the in-domain feature set and the time-frequency features; performing a fault mechanism analysis on the multi-domain fault sample set to obtain modulation features under each single fault; carrying out a feature engineering on the time-domain and frequency-domain features, and screening out relevant fea- (Continued)

tures, redundant features and irrelevant features; performing an unsupervised hierarchical clustering on test set fault samples, and then inputting the test set fault samples into a KNN model for a classification, and obtaining rolling bearing combined fault diagnosis results.

4 Claims, 16 Drawing Sheets

(56) References Cited

FOREIGN PATENT DOCUMENTS

| | | | |
|---|---|---|---|
| CN | 106092574 | A | 11/2016 |
| CN | 108073158 | A | 5/2018 |
| CN | 108168890 | A | 6/2018 |
| CN | 109612732 | A | 4/2019 |
| CN | 112766203 | A | 5/2021 |
| CN | 113177537 | A * | 7/2021 |
| CN | 113834658 | A | 12/2021 |
| CN | 114813123 | A | 7/2022 |
| CN | 116625685 | A | 8/2023 |
| JP | 2022024573 | A | 2/2022 |

OTHER PUBLICATIONS

Notification to Grant Patent Right for Invention dated Nov. 23, 2023 in SIPO application No. 202310426113.7.
International Search Report issued in corresponding PCT Application No. PCT/CN2024/073317 dated Apr. 3, 2024.

* cited by examiner

ROLLING BEARING COMBINED FAULT DIAGNOSIS METHOD BASED ON MULTI-DOMAIN FEATURE CONSTRUCTION

CROSS-REFERENCE TO RELATED APPLICATIONS

This application is a continuation of PCT/CN2024/073317, filed on Jan. 19, 2024 and claims priority of Chinese Patent Application No. 202310426113.7, filed on Apr. 20, 2023, the entire contents of which are incorporated herein by reference.

TECHNICAL FIELD

The application belongs to the technical field of fault diagnosis, and in particular relates to a rolling bearing combined fault diagnosis method based on a multi-domain feature construction.

BACKGROUND

As an important component of rotating machinery, the health states of rolling bearings have an important influence on the operation of the whole mechanical system. If the rolling bearing fails, it may cause the mechanical system to deviate from the normal working state, even cause shutdown, production stoppage and mechanical damage. Therefore, it is particularly important to carry out intelligent diagnosis and prediction research on rolling bearing fault, which plays an important role in ensuring the long-term and stable operation of mechanical equipment.

Nowadays, the research field of bearing fault diagnosis mainly focuses on the combination of vibration analysis, big data, artificial intelligence and other technologies, and adopts the mechanism+data driving method to improve the effect of bearing fault diagnosis. A complete mechanical fault diagnosis process generally includes signal acquisition and preprocessing, signal feature extraction and pattern recognition.

For the time-frequency feature extraction methods of vibration signals of rolling bearings, such as empirical mode decomposition (EMD), set EMD and local mean decomposition (LMD) are often used, but all the above methods belong to recursive mode decomposition, which has the problems of endpoint effect and mode aliasing. Although the method of rolling bearing with single fault state has been widely studied, there has been no good solution to the open-set identification problem of combined faults which are interrelated and cross-influenced, because of the diversity of faults, the imbalance of strength and the interaction effect among faults.

SUMMARY

Aiming at the problem that it is difficult to comprehensively distinguish the health state of the rolling bearings due to the features such as the diversity of faults, the imbalance of strength, the interaction effect among faults and the like, the application provides a rolling bearing combined fault diagnosis method based on a multi-domain feature construction.

In order to solve the above problems, the application provides the following scheme: a rolling bearing combined fault diagnosis method based on a multi-domain feature construction, including:

collecting vibration signals of rolling bearings, extracting time-domain and frequency-domain features of fault-sensitive vibration signals of the rolling bearings by using a distance evaluation technology, and obtaining an in-domain feature set;

performing an improved empirical mode decomposition on the vibration signals of the rolling bearings to obtain time-frequency features;

constructing a multi-domain fault sample set based on the in-domain feature set and the time-frequency features;

performing a fault mechanism analysis on the multi-domain fault sample set by using an ensemble empirical mode decomposition (EEMD) and a kurtosis maximum criterion to obtain modulation features under each single fault;

carrying out a feature engineering on the time-domain and frequency-domain features, and screening out relevant features, redundant features and irrelevant features;

performing an unsupervised hierarchical clustering on test set fault samples with unknown labels, and then inputting the test set fault samples with unknown labels into a k-nearest neighbor (KNN) model for a classification, and obtaining rolling bearing combined fault diagnosis results.

Optionally, a process of obtaining the in-domain feature set and the time-frequency features, and constructing the multi-domain fault sample set based on the in-domain feature set and the time-frequency features includes:

after collecting the vibration signals of the rolling bearings and performing a data preprocessing, calculating statistical features indicators of time-domain and frequency-domain, and selecting fault-sensitive indicators of the time-domain and frequency-domain statistical features according to the distance evaluation technology to form the in-domain feature set;

at the same time, performing a wavelet threshold denoising on the vibration signals of the rolling bearings, and then performing the EEMD decomposition, and screening the IMF components according to a cross-correlation method, and constructing an energy matrix based on the IMF components, and performing a single value decomposition (SVD) decomposition to obtain EMD-SVD features.

fusing the in-domain feature set and the empirical mode decomposition-single value decomposition (EMD-SVD) features through a principal component analysis (PCA) dimensionality reduction, and obtaining the multi-domain fault sample set.

Optionally, a process of selecting the fault-sensitive indicators of the time-domain and frequency-domain statistical features according to the distance evaluation technology to form the in-domain feature set includes:

calculating the statistical features indicators of the time-domain and the frequency-domain respectively, arranging the statistical feature indicators in a descending order, and obtaining feature sets of various types of rolling bearing faults according to the distance evaluation technology based on feature parameters with the statistical feature indicators greater than or equal to preset thresholds;

where the statistical features indicators of the time-domain include an absolute mean value, a peak value, an effective value, a square root amplitude, a variance, a peak-peak value, a skewness, a kurtosis, a waveform factor, a pulse factor, a margin factor and a variation coefficient;

the statistical features indicators of the frequency-domain include a center of gravity frequency, a mean square frequency, a root mean square frequency, a frequency variance, a frequency standard deviation, a spectral peak stability index, a first frequency band relative energy, a second frequency band relative energy, a third frequency band relative energy, a fourth frequency band relative energy and a fifth frequency band relative energy.

Optionally, a processing of performing the fault mechanism analysis on the multi-domain fault sample set by using the EEMD and the kurtosis maximum criterion to obtain the modulation features under each single fault includes:

separating high-frequency components in the vibration signals of the rolling bearings from original signals by the EEMD, and selecting Intrinsic Mode Function (IMF) components obtained by an EEMD decomposition according to the kurtosis maximum criterion, and extracting fault frequencies and the modulation features of each state under actual working conditions by an envelope demodulation.

Optionally, a process of extracting the fault frequencies and the modulation features of each state under the actual working conditions by the envelope demodulation includes:

performing the EEMD on the vibration signals of the rolling bearings to obtain a group of the IMF components with different frequency components and frequencies arranged in sequence from high to low;

calculating the kurtosis value of each of the IMF components, selecting an IMF with a largest kurtosis value for the envelope demodulation, and obtaining envelope signals through a Hilbert transform;

performing a Fourier transform on the envelope signals to obtain an envelope spectrum of the envelope signals;

based on the envelope spectrum, performing an envelope analysis on a high-frequency natural vibration, a rotating frequency and a frequency doubling of the rotating frequency, a fault feature frequency and a frequency doubling of the fault feature frequency, and a rotating frequency and a frequency doubling sideband of the rotating frequency existing in a fault feature frequency accessory, and obtaining correlation results between different fault states according to a feature frequency on the envelope spectrum.

Optionally, the single faults of the rolling bearings include an inner ring fault, an outer ring fault and a rolling element fault;

combined faults of the rolling bearings are formed by combining any two or more forms of the inner ring fault, the outer ring fault and the rolling element fault in the single faults;

the inner ring fault is modulated by high-frequency natural vibration signals, inner ring fault feature frequency signals and rotating frequency signals;

the outer ring fault is modulated by high-frequency natural vibration signals and outer ring fault feature frequency signals;

the rolling element fault is modulated by a feature frequency of the rolling element fault and a frequency doubling of the feature frequency of the rolling element fault an associated vibration frequency and the frequency doubling with the associated vibration frequency being the rotating frequency.

Optionally, a process of carrying out the feature engineering on the time-domain and frequency-domain features, and screening out the relevant features, the redundant features and the irrelevant features includes:

drawing a time-domain and frequency-domain feature box plot based on the in-domain feature set, and analyzing a concentration trend and a dispersion degree of each feature among the rolling bearings in different health states based on the time-domain and frequency-domain feature box plot; according to the concentration trend and the dispersion degree, performing a screening and obtaining the relevant features, the redundant features and the irrelevant features;

where indicator conditions among rolling bearing states show that intervals are not overlapping with each other, upper and lower limits of each interval define an area independently, without including a same range with other state intervals, and spans are existed among defined areas of the each interval, regarding as the relevant features;

the indicator conditions of some of the rolling bearing states show that the intervals are not overlapping each other, and spans are existed among the intervals, regarding as the redundant features;

the indicator conditions of each of the rolling bearing states show that the intervals are overlapping each other or spans are existed among the intervals but the spans are too small, regarding as the irrelevant features.

Optionally, a process of performing the unsupervised hierarchical clustering on the test set fault samples with the unknown labels, and then inputting the test set fault samples with the unknown labels into the KNN model for the classification, and obtaining the rolling bearing combined fault diagnosis results includes:

importing a fault sample set of a training set with known labels into KNN model, and dividing the training set by a 10-fold cross validation, and performing a parameter optimization design by a grid search method;

performing the unsupervised hierarchical clustering on the test set fault samples with the unknown labels, and determining an optimal number of clustering clusters according to an Elbow method and a scatter diagram, and importing the test set fault samples with the unknown labels into the KNN model for a testing, and then obtaining classification results;

verifying the classification results and compared with a mechanism analysis and a feature engineering conclusion, and finally obtaining the rolling bearing combined fault diagnosis results with the unknown labels.

The application discloses the following technical effects.

The application selects time-domain and frequency-domain features of fault-sensitive vibration signals by using a distance evaluation technology, and combining the time-frequency features obtained by improved empirical mode decomposition to construct a multi-domain fault sample set; EEMD and kurtosis maximum criterion are used to analyze the fault mechanism, and the modulation features of each single fault are obtained. Then, feature engineering is carried out on the screened time-domain and frequency-domain features, and three types of features are screened out: relevant features, redundant features and irrelevant features. Unsupervised hierarchical clustering is carried out on the test set fault samples with unknown labels, and then the test set fault samples with unknown labels are input to KNN model for a training, and the classification results are compared with mechanism analysis and feature engineering conclusions for multiple verification, and finally the results are obtained. Experimental research shows that the method provided by the application may identify the combined fault state of the recombination type of the rolling bearing by using the known single fault data under the condition that the combined fault of the test set is unlabeled, and the results are scrutinized multiple times, so that the fault diagnosis accuracy is high. Meanwhile, the feature extraction method of the vibration signal has reference significance for other component fault diagnosis technologies based on vibration signals.

BRIEF DESCRIPTION OF THE DRAWINGS

In order to explain the embodiments of the present application or the technical scheme in the prior art more clearly, the drawings needed in the embodiments will be briefly introduced below. Obviously, the drawings described below are only some embodiments of the present application, and other drawings may be obtained according to these drawings without creative work for ordinary people in the field.

DETAILED DESCRIPTION OF THE EMBODIMENTS

In the following, the technical scheme in the embodiment of the application will be clearly and completely described with reference to the attached drawings. Obviously, the described embodiment is only a part of the embodiment of the application, but not the whole embodiment. Based on the embodiments in the present application, all other embodiments obtained by ordinary technicians in the field without creative labor belong to the scope of protection of the present application.

In order to make the above objects, features and advantages of the present application more obvious and easy to understand, the present application will be further described in detail with the attached drawings and specific embodiments.

Figure 1:
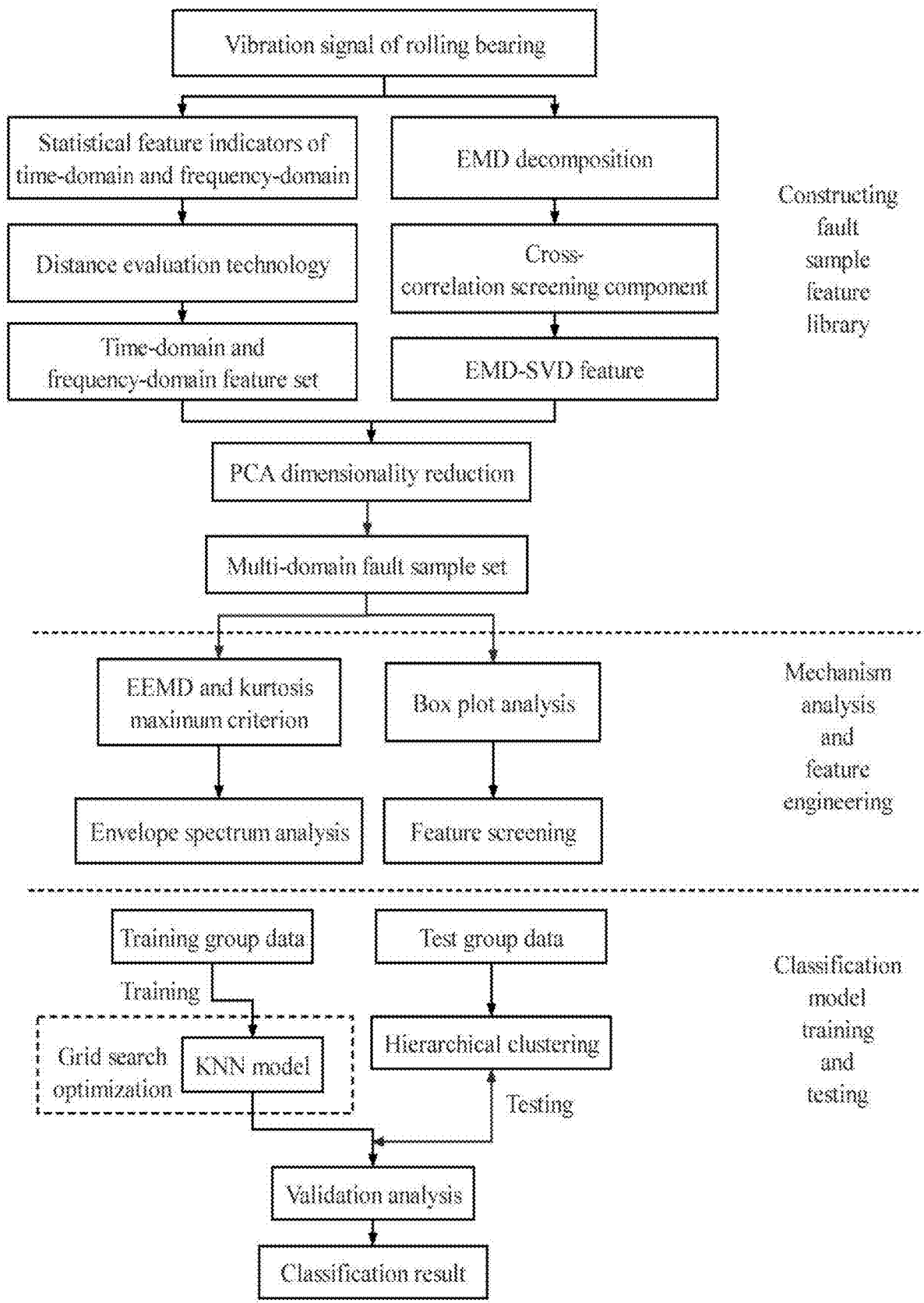
FIG. 1 is a flowchart of a rolling bearing combined fault diagnosis method according to the present application.

As shown in FIG. 1, the application provides a rolling bearing combined fault diagnosis method based on a multi-domain feature construction, including: constructing a fault sample feature library, a mechanism analysis and feature engineering, and a training and testing a classification model.

Further, a fault sample feature library is constructed:

the collected vibration signals of rolling bearings are preprocessed, and the statistical feature indicators of the time-domain and frequency-domain are calculated. According to the distance evaluation technology, fault-sensitive features are selected to form an in-domain feature set. At the same time, the vibration signals of rolling bearings are decomposed by EMD, the IMF components are screened according to the cross-correlation method, the energy matrix of the IMF components is constructed, and the EMD-SVD features are obtained by SVD decomposition.

The multi-domain fault sample set is obtained by PCA dimensionality reduction fusion time-domain and frequency-domain feature sets and EMD-SVD features.

Further optimize the scheme, the specific process of constructing the fault sample feature library is as follows:
(1) The Extraction of Time-Domain and Frequency-Domain Feature Set The 13 parameters of the absolute mean value, peak value, effective value, square root amplitude, variance, peak-peak value, skewness, kurtosis, waveform factor, pulse factor, margin factor and variation coefficient in time-domain and 11 parameters in frequency-domain of the center of gravity frequency, mean square frequency, root mean square frequency, frequency variance, frequency standard deviation, spectral peak stability index, first frequency band relative energy, second frequency band relative energy, third frequency band relative energy, fourth frequency band relative energy and fifth frequency band relative energy are calculated respectively. Then, each feature evaluation indicator $J_A$ is obtained by using distance evaluation technology, and the feature parameters with $J_A$ greater than or equal to 6 are arranged in descending order to form the in-domain feature set.

It is assumed that there are c types of rolling bearing faults (such as normal state, inner ring fault, outer ring fault, rolling element fault, etc.), and the fault types included are $\{\omega_i, i=1, 2, \ldots c\}$, and the feature set corresponding to one of the fault types may be expressed as $$\{p^{(i,k)}, k = 1, 2, \ldots N_i\} \quad (1)$$

where $p^{(i, k)}$ represents the k-th feature of the corresponding vector, and $N_i$ is the number of this feature in $\omega_i$. Parameter selection may be divided into the following steps:

the within-class average distance of all features of in $\omega_i$ is calculated:

$$S_i = \frac{1}{2} \frac{1}{N_i} \sum_{j=1}^{N_i} \frac{1}{N_i - 1} \sum_{k=1}^{N_i} |p^{(i,j)} - p^{(i,k)}|, \quad (2)$$

calculating the average value of the $S_i$, and obtaining the within-class average distance:

$$S_\omega = \frac{1}{c} \sum_{i=1}^{c} S_i, \quad (3)$$

calculating the between-class distance among c fault types of rolling bearings:

$$S_b = \frac{1}{c} \sum_{i=1}^{c} |\mu^{(i)} - \mu|, \quad (4)$$

where $\mu^{(i)}$ is the average value of all samples in $\omega_i$.

$$\mu^{(i)} = \frac{1}{N_i} \sum_{k=1}^{N_i} p^{(i,k)}, \quad (5)$$

$\mu$ is the average value of all samples in c fault types:

$$\mu = \frac{1}{c} \sum_{i=1}^{c} \frac{1}{N_i} \sum_{k=1}^{N_i} p^{(i,k)}, \quad (6)$$

defining the ratio of between-class distance and within-class distance as the distance evaluation indicator $J_A$:

$$J_A = \frac{S_b}{S_\omega}. \quad (7)$$

Because the parameters of different domains represent the features of signals in different domains, the application does not comprehensively sort all parameters, but evaluates the parameters of different domains by dividing the domains, and selects the parameters that are relatively sensitive to fault classification in the respective sets as the final feature indicator set, which is beneficial to enhancing the generalization performance of the fault model and enhancing the robustness of the system.

Figure 2:
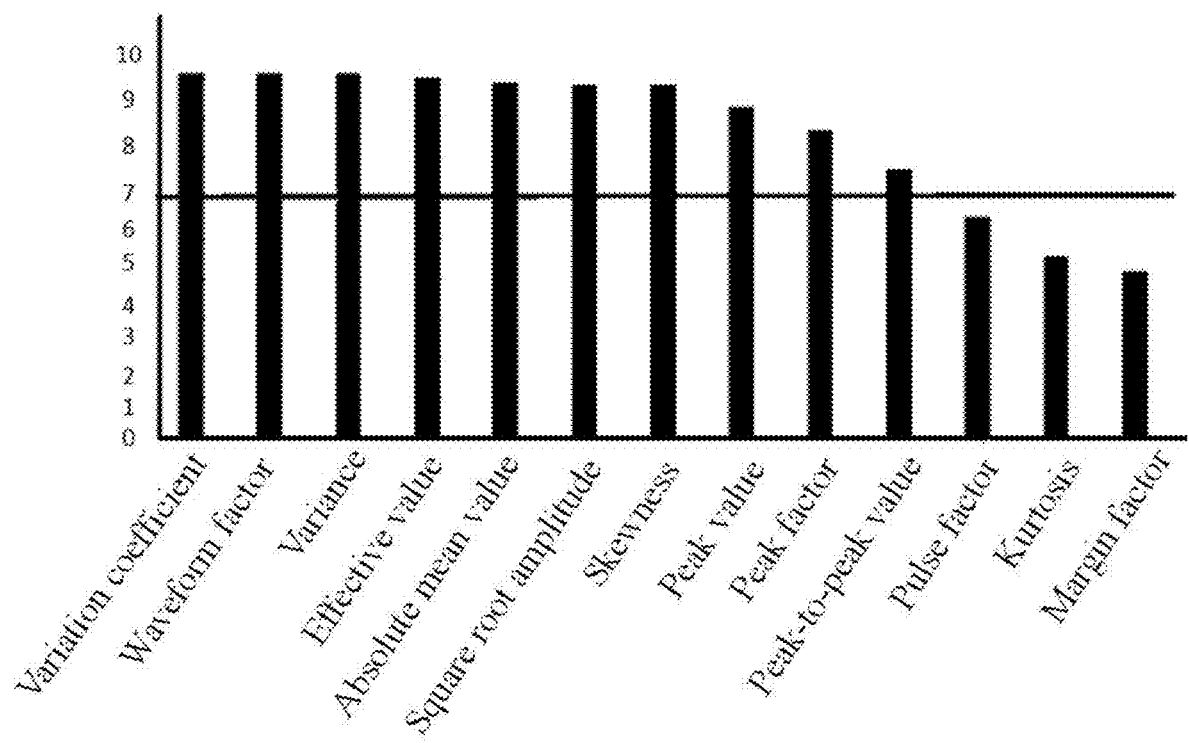
FIG. 2 is a time-domain signal feature arrangement diagram provided by an embodiment of the present application.
Figure 3:
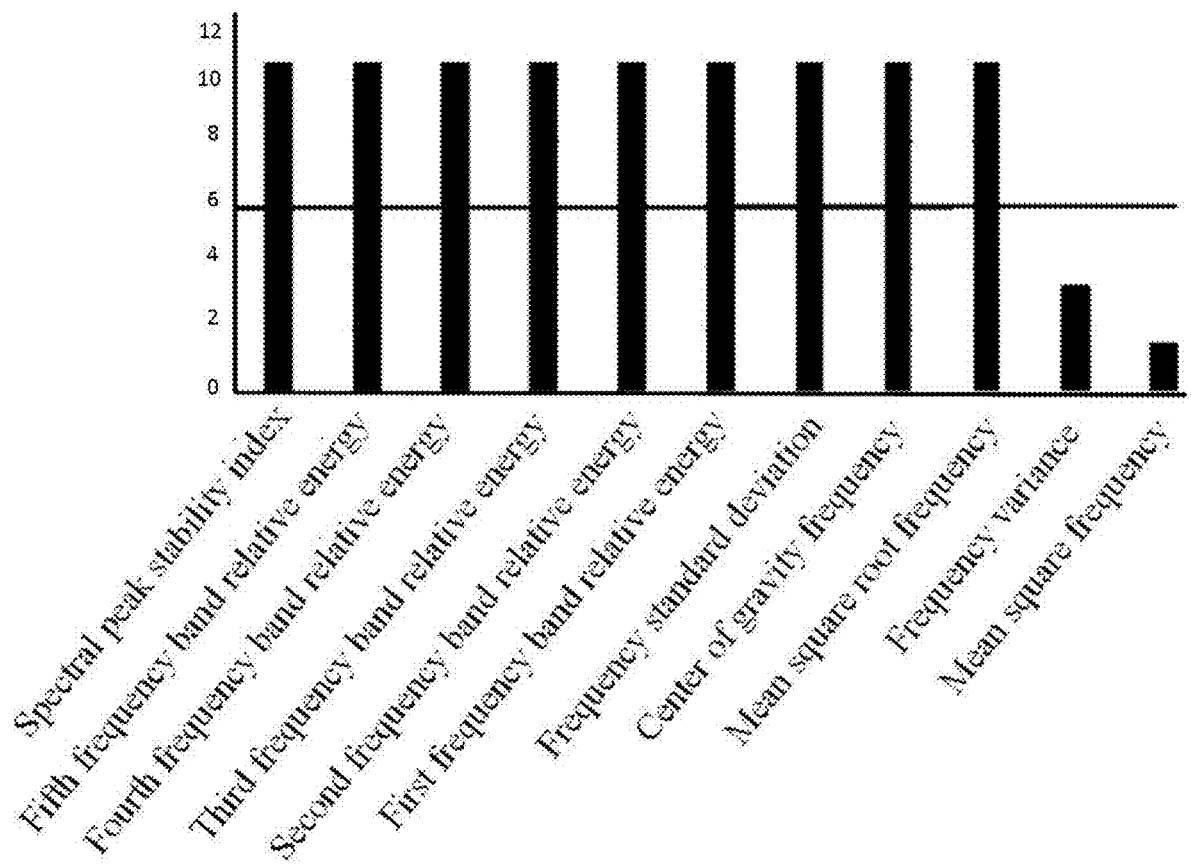
FIG. 3 is a frequency-domain signal feature arrangement diagram provided by an embodiment of the present application.

In this embodiment, the time-domain feature set that is relatively sensitive to rolling bearing fault classification includes 13 parameters, including variation coefficient, waveform factor, variance, effective value, absolute mean value, square root amplitude, skewness, peak value, peak factor, peak-to-peak value, pulse factor, kurtosis and margin factor, and the evaluation indicator arrangement diagram is shown in FIG. 2. The frequency-domain feature set that is relatively sensitive to rolling bearing fault classification includes 11 parameters, including spectral peak stability index, fifth frequency band relative energy, fourth frequency band relative energy, third frequency band relative energy, second frequency band relative energy, first frequency band relative energy, frequency standard deviation, center of gravity frequency, root mean square frequency, frequency variance and mean square frequency. The evaluation indicator arrangement diagram is shown in FIG. 3.

(2) EMD Component Screening

The vibration signals of rolling bearings are denoised by wavelet threshold and then decomposed by EMD. The number of EMD decomposition may be reduced and the influence of Runge phenomenon caused by multiple decomposition may be weakened. Due to certain termination conditions of EMD decomposition, in order to unify the dimensions of IMF matrix, the maximum number of iterations of EMD decomposition is set to 7. The first four IMF components of EMD decomposition of vibration signals of rolling bearings and the original signals are selected to calculate the cross-correlation coefficient $\rho_i(T)$, and the IMF components with the cross-correlation coefficient $\rho_i(T) \geq 0.1$ are selected as the effective IMF components, and the rest IMF components are discarded. The cross-correlation coefficient method is used to screen the IMF classification to see if it is a false classification. The higher the effective component of the original signal, the higher the cross-correlation coefficient.

(3) EMD-SVD Feature Extraction

For rolling bearings, once a fault occurs, the energy of some frequency bands will change to some extent, and the energy values of each IMF component obtained after EMD decomposition may be used as the features of fault diagnosis. The energy moment of each IMF component is calculated:

$$E_i = \sum_{k=1}^{n} (k \cdot \Delta t) |C_j(k \cdot \Delta t)|^2, \quad (8)$$

where $\Delta t$ is the sampling period, n is the total sampling point and k is the sampling point.

Constructing feature vector T:

$$T = [E_1, E_2, E_3, \ldots E_n] / \sum_i E_i, \quad (9)$$

The four-dimensional feature vector of this embodiment is expressed as:

$$[E_1, E_2, E_3, E_4]^T.$$

SVD decomposition is performed on the obtained four-dimensional initial vector matrix to obtain a four-dimensional singular value decomposition feature vector, which is expressed as:

$$[\sigma_1, \sigma_2, \sigma_3, \sigma_4]^T.$$

(4) The multi-domain fault sample set is obtained by PCA dimensionality reduction fusion time-domain and frequency-domain feature sets and EMD-SVD features.

140 samples in 23 dimensions composed of time-domain and frequency-domain feature sets and EMD-SVD features are fused, and the contribution rate and cumulative contribution rate of each principal component are calculated. The least number of principal components is selected so that the cumulative contribution rate of principal components exceeds 95%, forming a multi-domain feature library set. In this embodiment, 140 training samples in 23 dimensions are transformed into 3-dimensional *140 samples while retaining 95% information of the original data, which obviously reduces the data dimension, which is beneficial to reducing the calculation time of diagnosis and reducing the calculation amount of subsequent classification diagnosis.

Further, mechanism analysis and feature engineering:

the high-frequency components in the vibration signals of rolling bearings are separated from the original signal by EEMD, and the IMF decomposed by EEMD is selected according to the kurtosis maximum criterion, and the fault frequency and modulation features of each state under actual working conditions are extracted by envelope demodulation.

Further optimize the scheme, specifically including:

(1) EEMD Decomposition of Vibration Signals of Rolling Bearings

Figure 4:
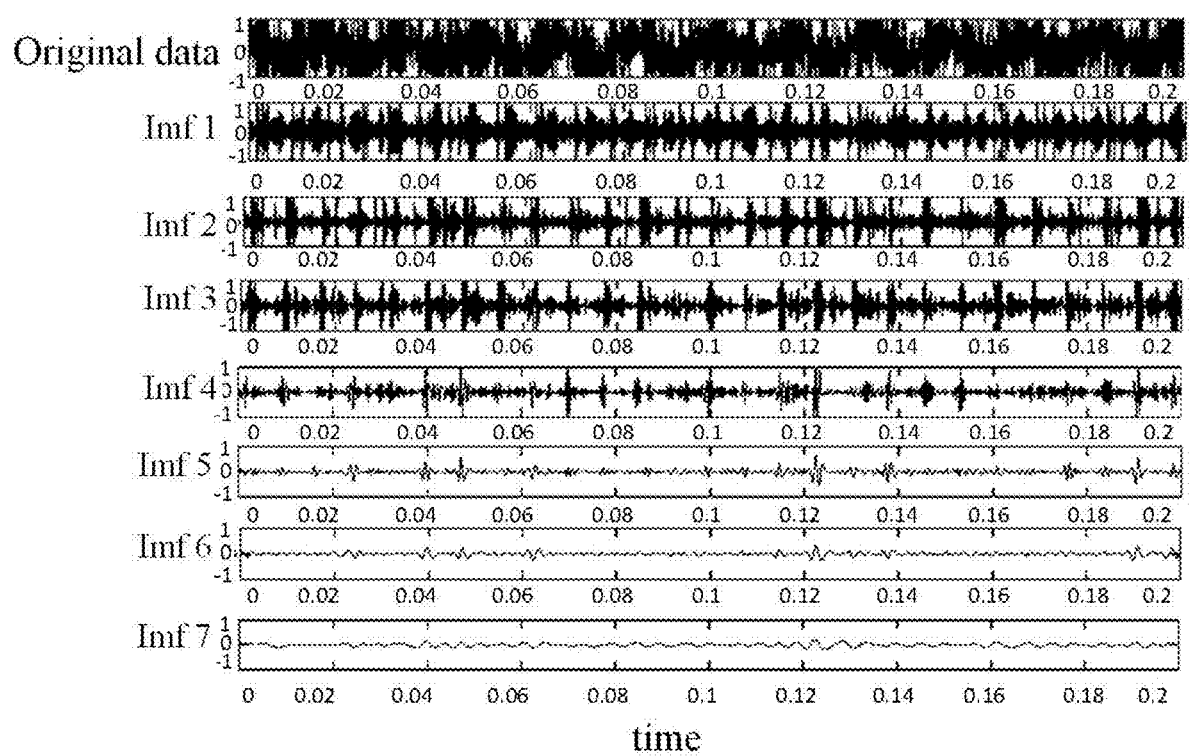
FIG. 4 is the result of vibration signal EEMD with inner ring fault state provided by an embodiment of the application.

A group of IMF components are obtained by EEMD decomposition of vibration signals of rolling bearings. The IMF component contains different frequency components, and their frequencies are arranged in order from high to low. EEMD method may suppress or eliminate the influence of noise in several decomposition results by adding Gaussian white noise to the target signal. In this embodiment, the EEMD decomposition result of vibration signals of rolling bearings inner ring fault state is shown in FIG. 4.

(2) The Kurtosis Maximum Criterion Selects the IMF Component Obtained by EEMD Decomposition The kurtosis value of each IMF component is calculated, and the IMF with the largest kurtosis value is selected for an envelope demodulation to obtain the envelope signal.

When the rolling bearing is in normal operation, the amplitude distribution of its vibration signal is close to normal distribution, and the kurtosis value is about equal to 3. When the rolling bearing has a local fault, the fault causes the vibration signal to deviate from the normal distribution, and the vibration signal is mixed with impact components, which increases kurtosis. The greater the kurtosis value, the more the impact components in the vibration signal account for, and the more fault information it contains. Therefore, the IMF component with the largest kurtosis is selected as the research object of envelope demodulation.

(3) Envelope Spectrum Analysis

The impact vibration caused by faults may arouse the natural vibration of rolling bearings and equipment components in different frequency bands. Different IMF will contain the natural vibration components of different frequency bands caused by faults, and the low-frequency modulation signals of these high-frequency IMF all contain fault information. The IMF with the largest kurtosis after EEMD is selected as the object of envelope demodulation, and the envelope signal is Fourier transformed to obtain the envelope spectrum of the signal.

The envelope analysis is performed on a high-frequency natural vibration, a rotating frequency and a frequency doubling of the rotating frequency, a fault feature frequency and a frequency doubling of the fault feature frequency, and a rotating frequency and a frequency doubling sideband of the rotating frequency existing in a fault feature frequency accessory, and the fault type of rolling bearing is judged according to the feature frequency on the spectrum.

Kurtosis is a dimensionless parameter to describe the peak degree of waveform. Hilbert transform is performed on the IMF component with the largest kurtosis to obtain the envelope signal. The envelope spectrum of the signal is obtained by Fourier transform, and the expression is as follows:

$$K = \frac{E(x-\mu)^4}{\sigma^4}, \quad (10)$$

where $\mu$ is the average value of signal x; $\sigma$ is the standard deviation of signal x.

Figure 5:
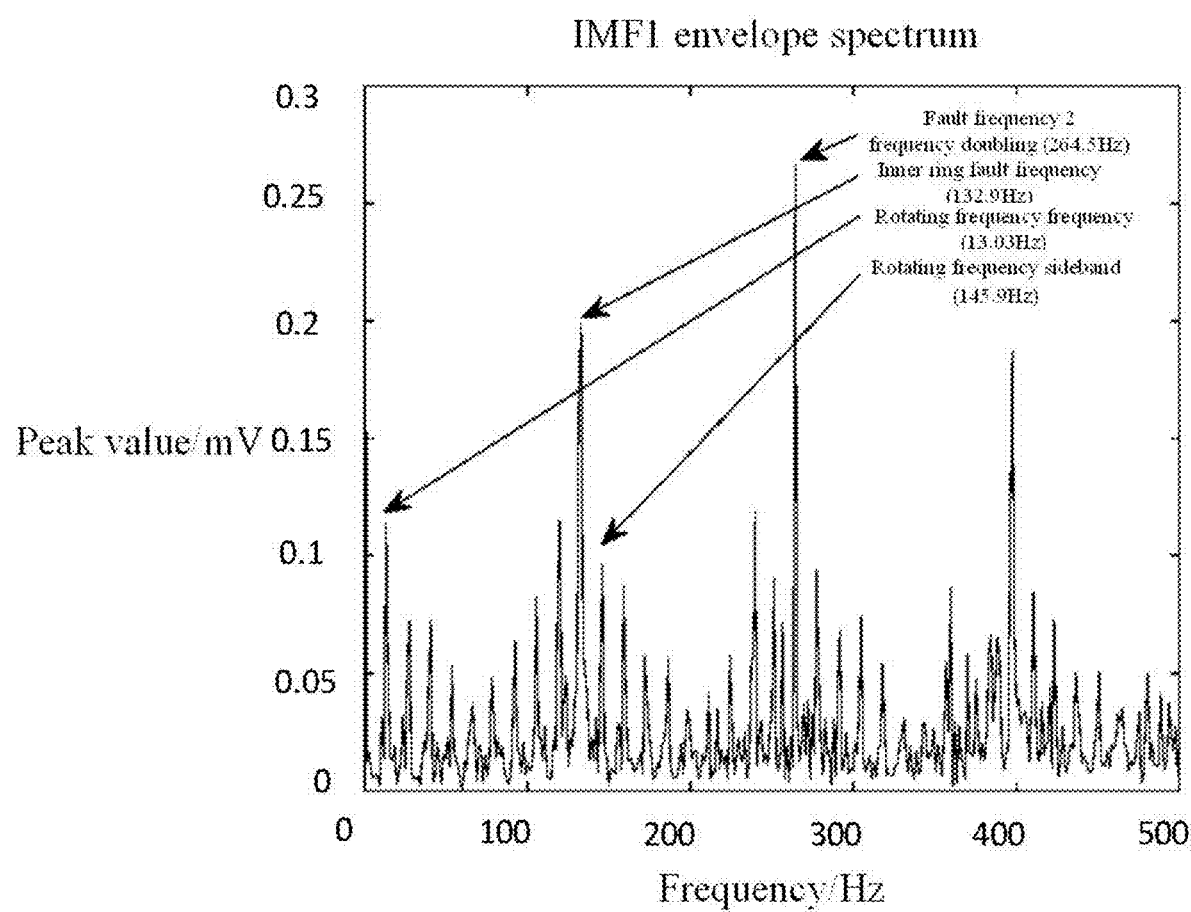
FIG. 5 is an envelope diagram of vibration signal IMF1 with inner ring fault state provided by an embodiment of the present application.
Figure 6:
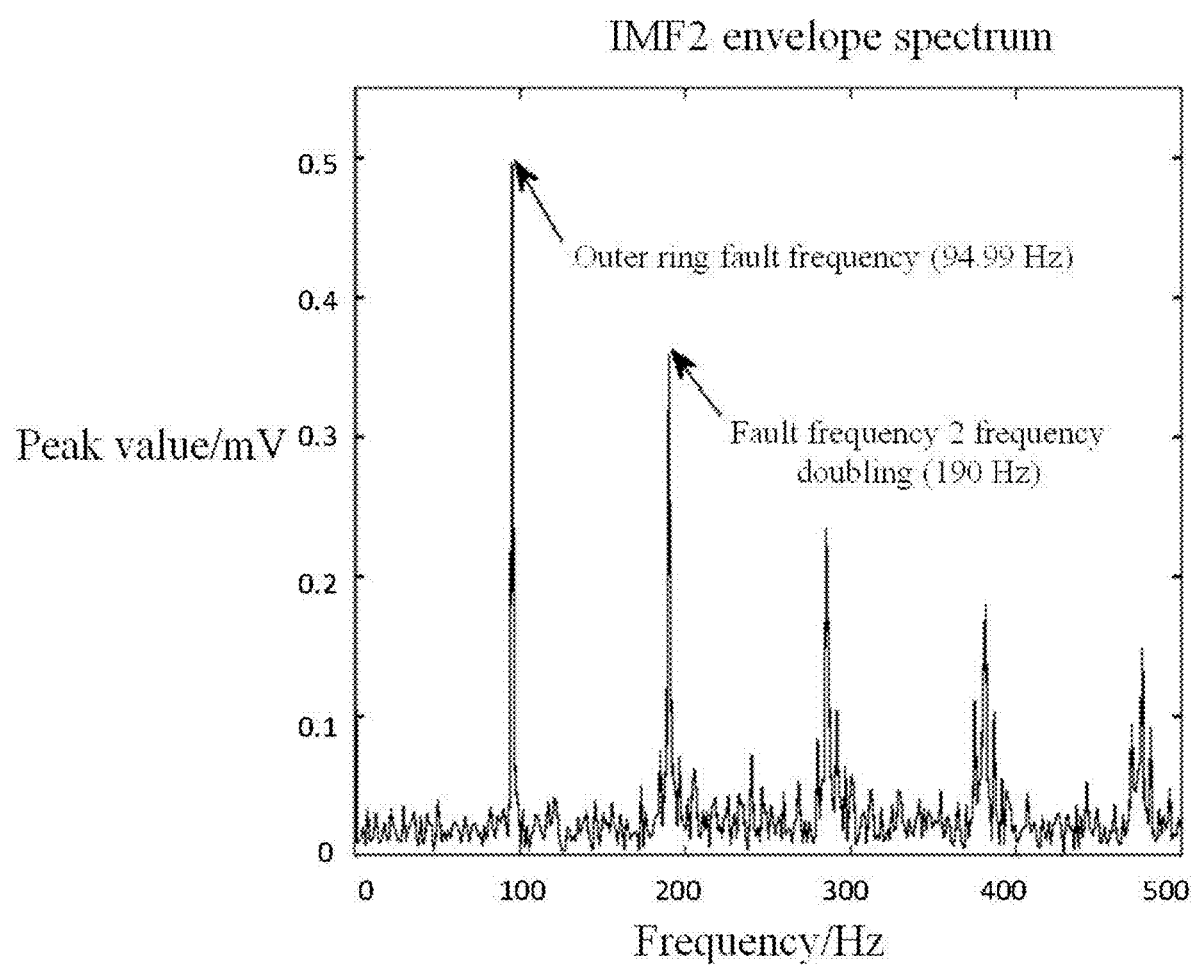
FIG. 6 is an envelope diagram of a vibration signal IMF2 with outer ring fault state provided by an embodiment of the present application.
Figure 7:
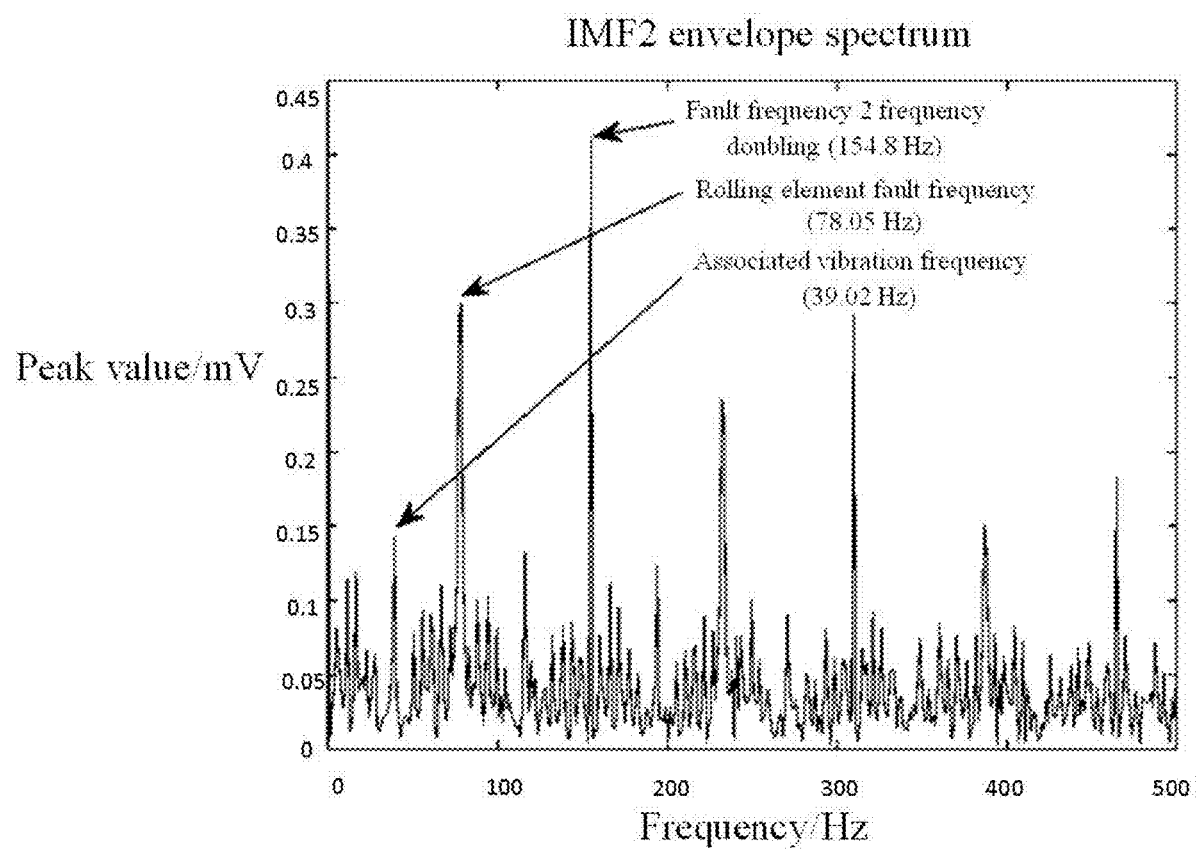
FIG. 7 is an envelope diagram of a vibration signal IMF2 with rolling element fault state provided by an embodiment of the present application.

According to the spectral feature frequency, correlations with different fault states are obtained. The inner ring fault state of rolling bearing is modulated by high-frequency natural vibration signal, inner ring fault feature frequency signal and rotating frequency signal. In this embodiment, the rotating frequency frequency and rotating frequency sideband unique to the inner ring fault state are shown in FIG. 5. The outer ring fault state signal is only modulated by the high-frequency natural vibration signal and the outer ring fault feature frequency signal. In this embodiment, the outer ring fault state fault frequency and the frequency doubling are shown in FIG. 6. The fault state of the rolling element includes a feature frequency of the rolling element fault and the frequency doubling of the feature frequency of the rolling element fault, an associated vibration frequency and the frequency doubling with the associated vibration frequency being the rotating frequency. The associated vibration frequency unique to the fault state of the rolling element in this embodiment is shown in FIG. 7.

The feature selection engineering is carried out for time-domain and frequency-domain feature sets, and three types of features are obtained by box plot analysis: relevant features, redundant features and irrelevant features.

The time-domain and frequency-domain feature sets are analyzed by box plot to observe the concentration trend and dispersion degree of indicators among different rolling bearing fault states. The indicator conditions among rolling bearing states show that intervals are not overlapping with each other, and there is a certain span between the intervals, which is regarded as relevant features. The indicator conditions of some of the rolling bearing states show that the intervals are not overlapping each other, and there is a certain span among the intervals, which is regarded as redundant features. The indicator conditions of each of the rolling bearing states show that the intervals are overlapping each other or spans are existed among the intervals but the spans are too small, which is regarded as irrelevant features.

Further optimize the scheme, specifically including:

(1) drawing a time-domain and frequency-domain feature box plot: the statistical analysis of data by box plot method is that it may be applied to a wide range of data distribution, does not require data to strictly follow normal distribution, and may well determine and eliminate abnormal values in non-normal distribution and asymmetric distribution.

(2) analyzing the concentration trend and dispersion degree of each feature among rolling bearings in different health states. The box plot containing the average line may determine the data concentration trend of rolling bearings between different health states, and the upper and lower quartiles include the distribution of data and also reflect the degree of dispersion. In this way, the concentration trend and dispersion degree of data among rolling bearings in different health States may be well compared and analyzed through the box plot.

(3) screening out relevant features, redundant features and irrelevant features. The significance of feature screening is to determine the feature parameters closely related to the fault state and find out the internal relationship between the fault mode and the feature parameters. Indicator conditions among rolling bearing states show that intervals are not overlapping with each other, upper and lower limits of each interval define an area independently, without including a same range with other state intervals, and spans are existed among defined areas of the each interval, regarding as the relevant features; the indicator conditions of some of the rolling bearing states show that the intervals are not overlapping each other, and spans are existed among the intervals, regarding as the redundant features; the indicator conditions of each of the rolling bearing states show that the intervals are overlapping each other or spans are existed among the intervals but the spans are too small, regarding as the irrelevant features.

Figure 8:
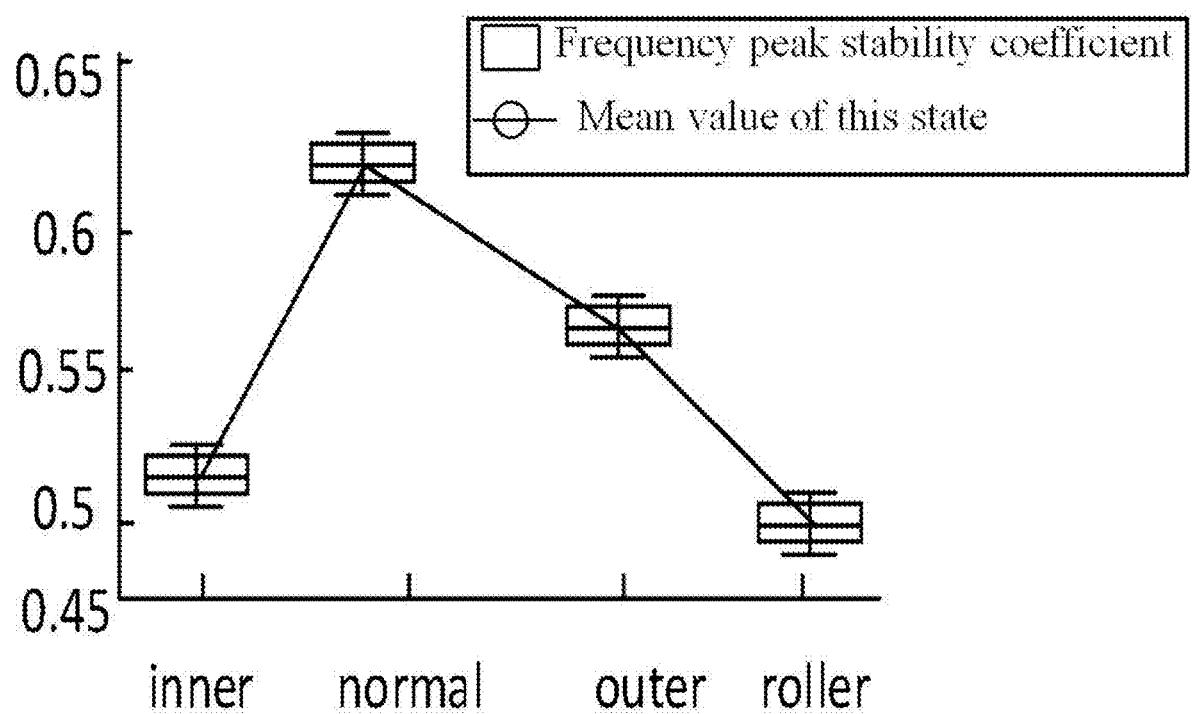
FIG. 8 is a feature box plot of the spectral peak stability coefficient of the rolling bearing of the training group provided by an embodiment of the application.
Figure 9:
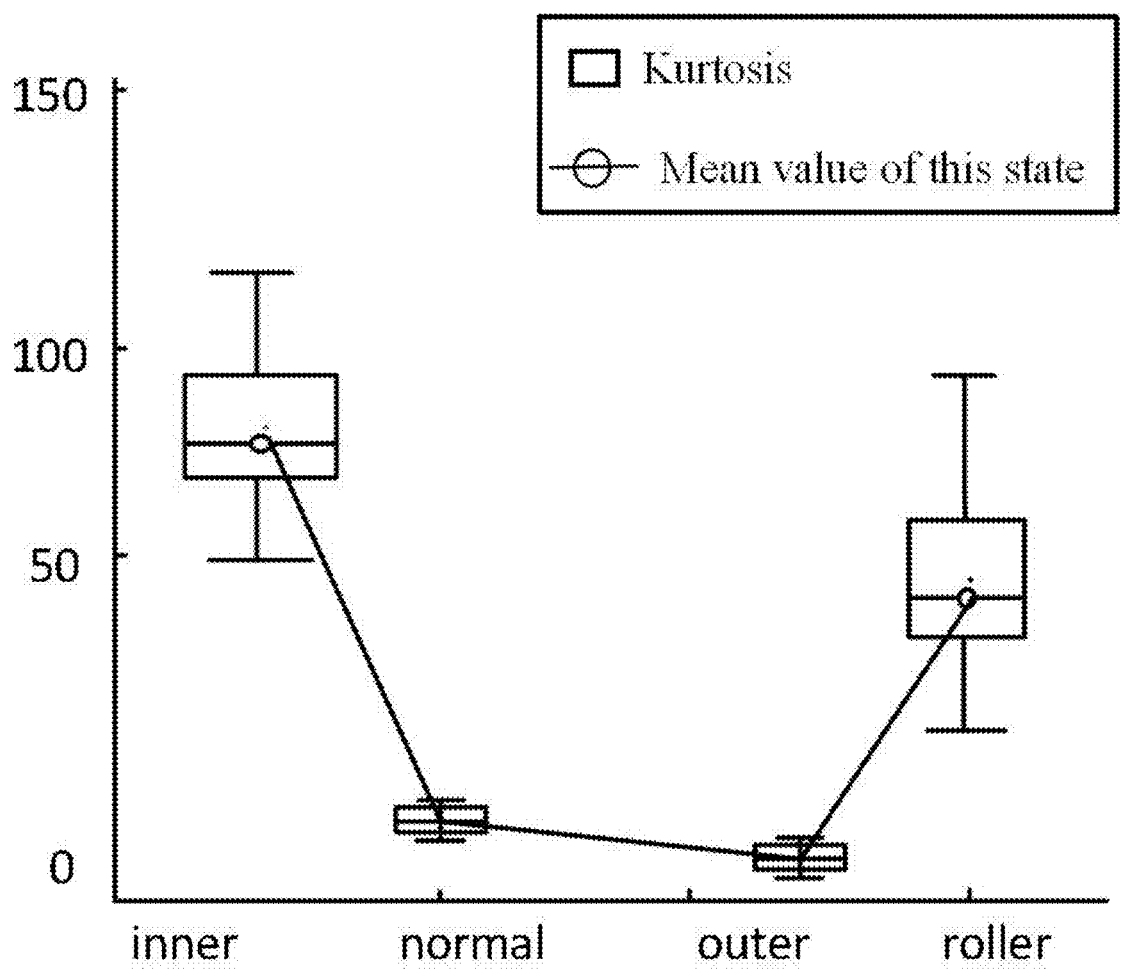
FIG. 9 is a kurtosis feature box plot of the rolling bearing of the training group provided by an embodiment of the application.
Figure 10:
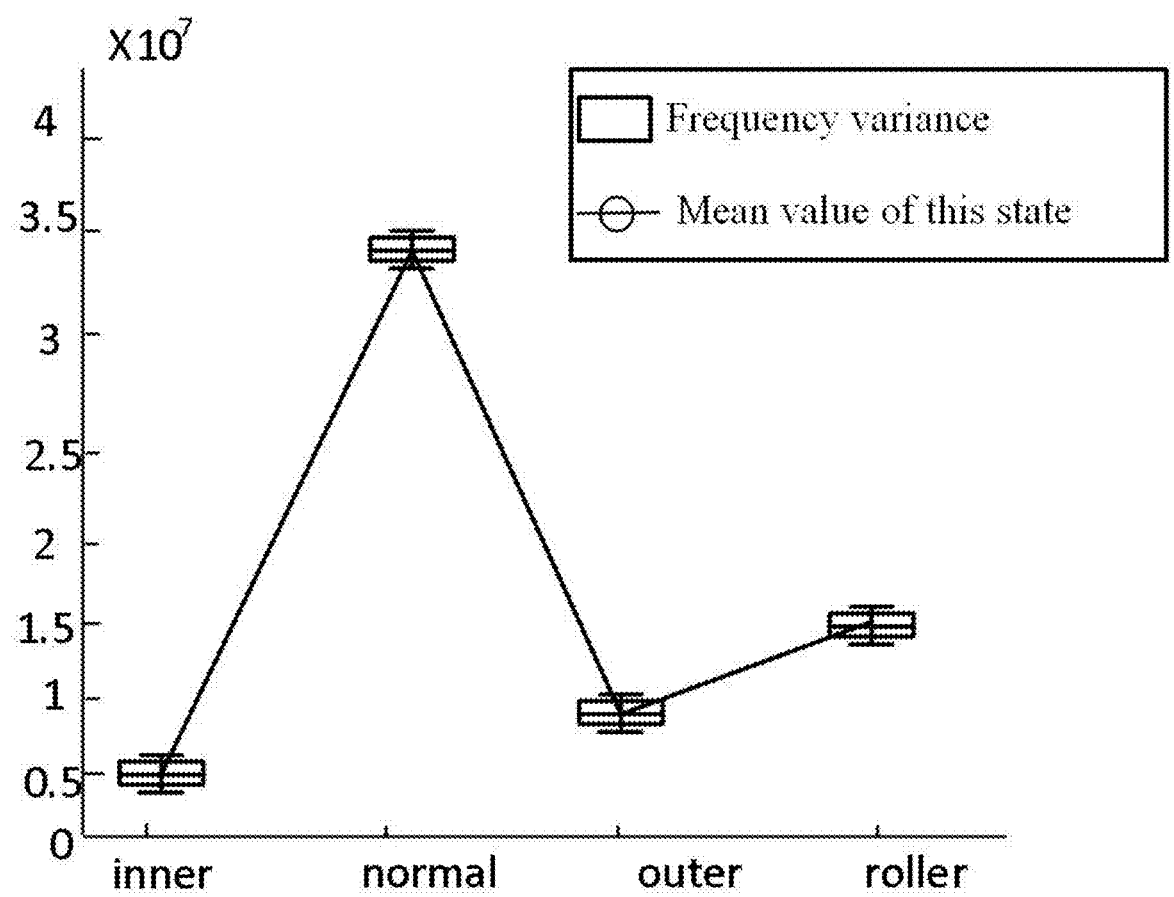
FIG. 10 is a feature box plot of the frequency variance of the rolling bearing of the training group provided by an embodiment of the application.

In this embodiment, the box plot of the spectral peak stability coefficient of the relevant features is shown in FIG. 8, which shows that the intervals do not overlap each other, and there is a certain span between the intervals. In this embodiment, the kurtosis box plot of redundant features is shown in FIG. 9, and the data generally presents two types: normal and outer ring state, inner ring and rolling element state. In this embodiment, as shown in FIG. 10, the box plot of the frequency variance of irrelevant features shows that there are differences in mean values in different states, but the numerical differences are too small, and there are overlapping areas in some state data distributions.

Further, the training and testing of the classification model:
 importing a fault sample set of a training set with known labels into the KNN model, and dividing the training set by a 10-fold cross validation, and performing a parameter optimization design by a grid search method;
 performing the unsupervised hierarchical clustering on the test set fault samples with the unknown labels, and determining an optimal number of clustering clusters according to an Elbow method and a scatter diagram, and importing the test set fault samples with the unknown labels into the KNN model for a testing, and then obtaining classification results; verifying the classification results and compared with a mechanism analysis and a feature engineering conclusion, and finally obtaining the rolling bearing combined fault diagnosis results with the unknown labels.

To further optimize the scheme, the specific process of training and testing the classification model is as follows:

(1) Training and optimizing KNN classification model: inputting the training group into KNN classifier for learning and training, and setting the verification mode as 10-fold cross validation to reduce the accidental error of model results caused by dividing data sets.

Figure 11:
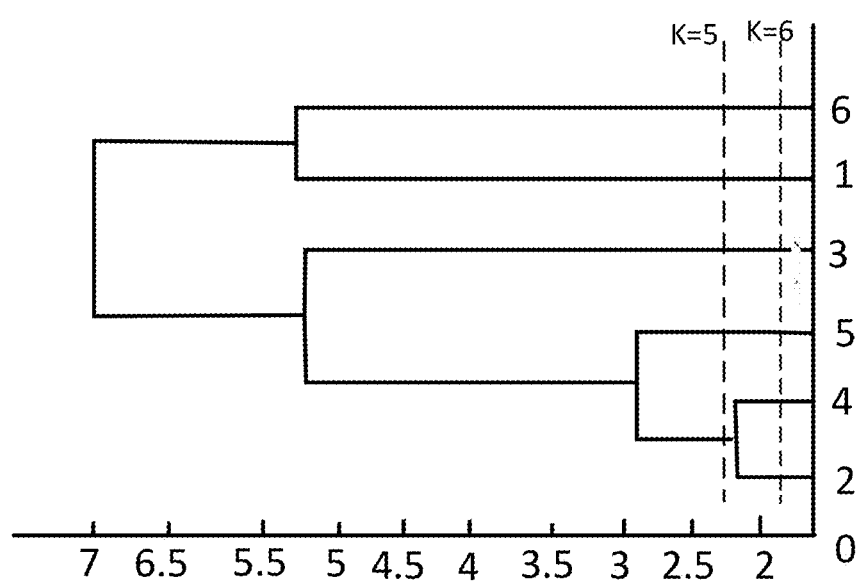
FIG. 11 is a hierarchical diagram of the rolling bearing of the test group provided by an embodiment of the application.

(2) Performing the unsupervised hierarchical clustering on the test set to determine the optimal number of clustering clusters. Unsupervised hierarchical clustering is used to cluster the test set, and the distance is measured by the square of Euclidean distance in the form of inter-group connection. The obtained hierarchical diagram is shown in FIG. 11. According to the problem features of this embodiment, the appropriate clustering algorithm is selected for analysis. The vibration signals of rolling bearings do not show a certain shape cluster in the spatial database, so the density-based clustering DBSCAN algorithm may not be used. Because the test set contains data sets with unknown number and category of labels, for this kind of clustering with less prior information, hierarchical system clustering algorithm may perform aggregation and division according to the similarity of data points.

The number of clusters finally determined by hierarchical clustering is a user-defined number, which is generally determined by combining hierarchical diagram with Elbow method. Elbow method is to roughly estimate the optimal number of clusters through graphs.

It is assumed that n samples are divided into K classes (K≤n−1, that is, at least one class has two elements), $C_k$ is used to represent the k classes (k=1, 2, . . . , K), and the position of the center of gravity of this class is denoted as $u_k$, then the distortion degree of the k classes is:

$$\sum_{i \in C_k} |x_i - u_k|^2 \qquad (11)$$

Defining the total distortion degree of all classes:

$$J = \sum_{k=1}^{K} \sum_{i \in C_k} |x_i - u_k|^2 \qquad (12)$$

Figure 12:
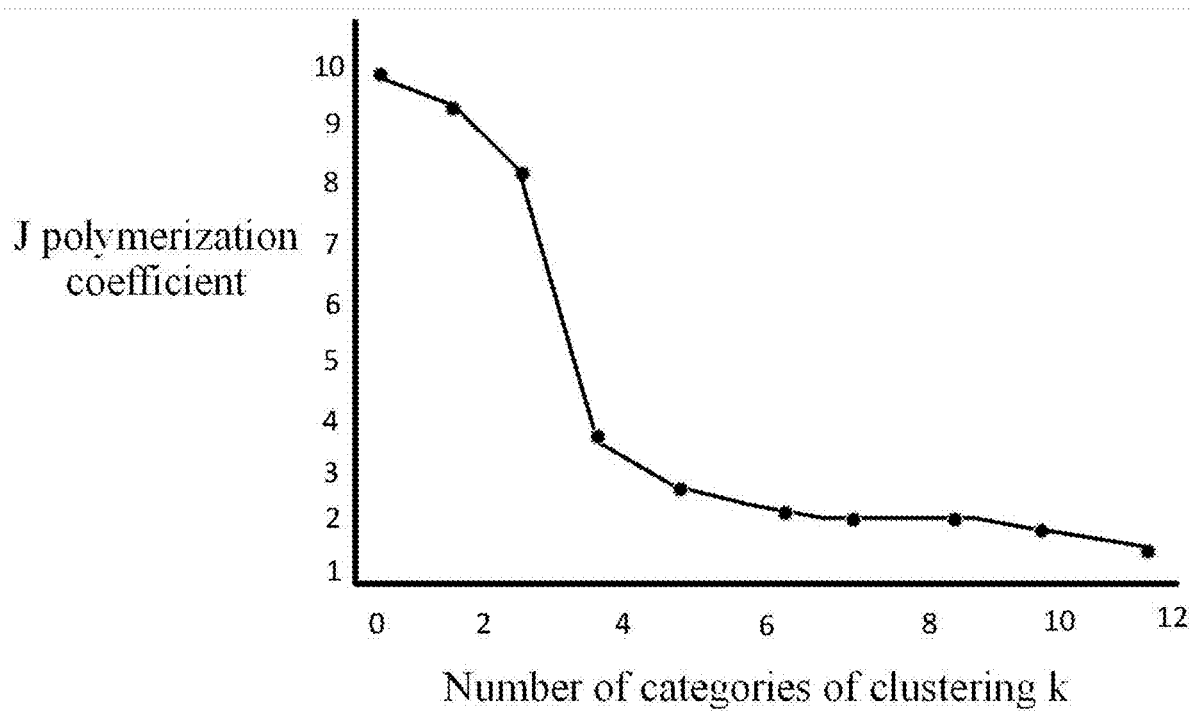
FIG. 12 is a line chart of the polymerization coefficient of the rolling bearing of the test group provided by an embodiment of the application.

J is also called the polymerization coefficient. A line chart is drawn by taking the abscissa as the cluster number K and the ordinate as the aggregation coefficient J, as shown in FIG. 12.

In this embodiment, the K value of the training group samples may be divided into 5 and 6, but when K=6 is specified, there is only one element in one class, which does not conform to the calculation principle of aggregation coefficient, and it is observed that K=5 is the optimal number of clustering clusters in combination with the scatter plot.

(3) Testing the KNN classification model, and comparing the classification results with the mechanism analysis and feature engineering conclusions. The test group is imported into KNN classification model, and the classification result is obtained.

Figure 13:
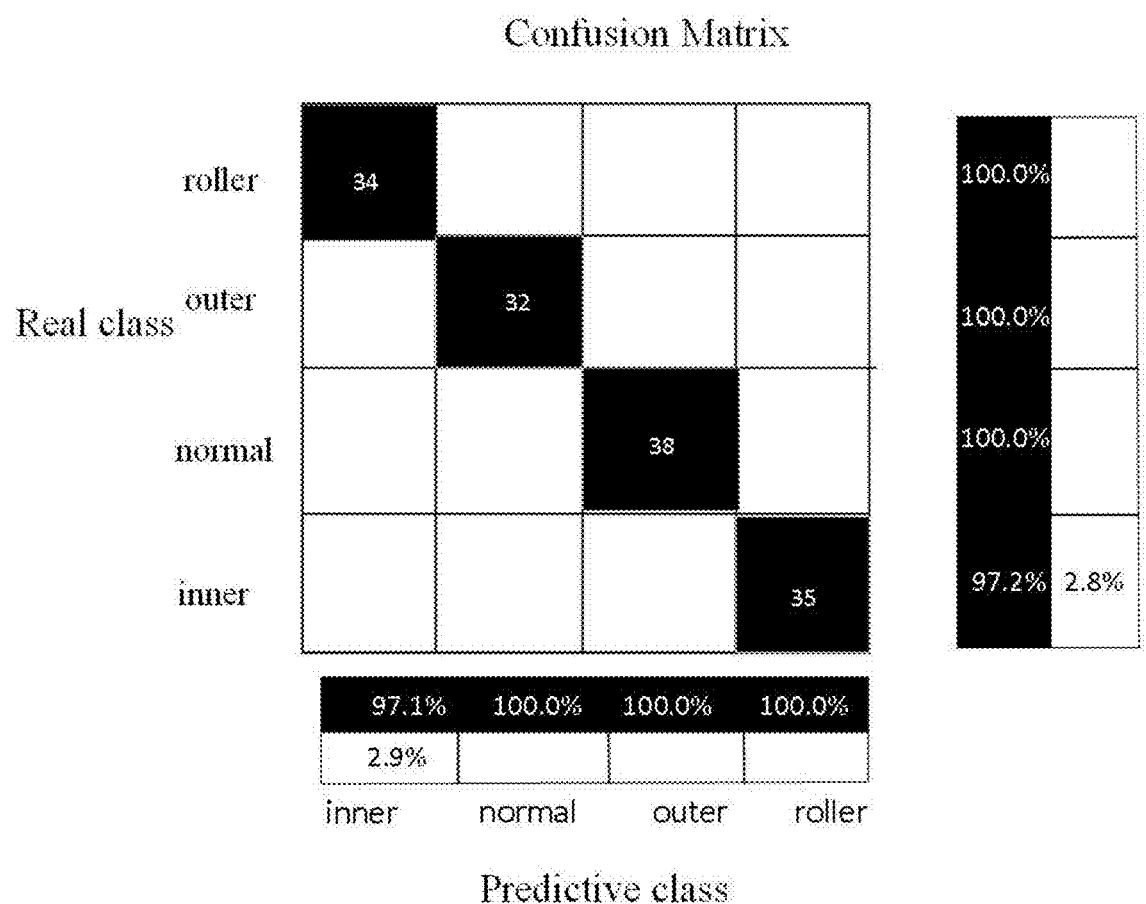
FIG. 13 is the training result of KNN classification model provided by an embodiment of the present application.
Figure 14:
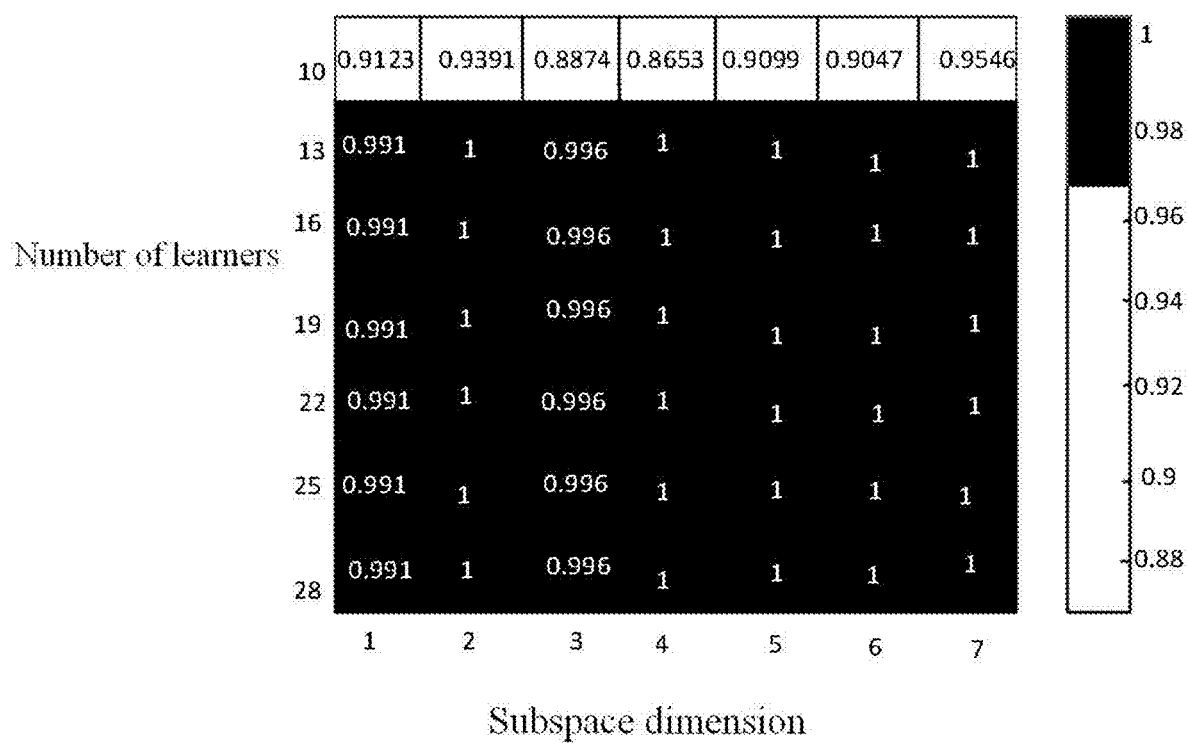
FIG. 14 is a heat map for optimizing KNN classification model provided by an embodiment of the present application.

As shown in FIG. 13-FIG. 14, the increase of the number of learners and subspace dimension will complicate the model. Therefore, under the premise of ensuring the accuracy, the number of learners and subspace dimension may be reduced as much as possible to reduce the complexity of the model. As can be seen from FIG. 14, when the search range of the specified subspace dimension is set to 2 and the number of learners is set to 13, the model parameter reaches the best, so this parameter is adopted as the final optimization result.

Figure 15:
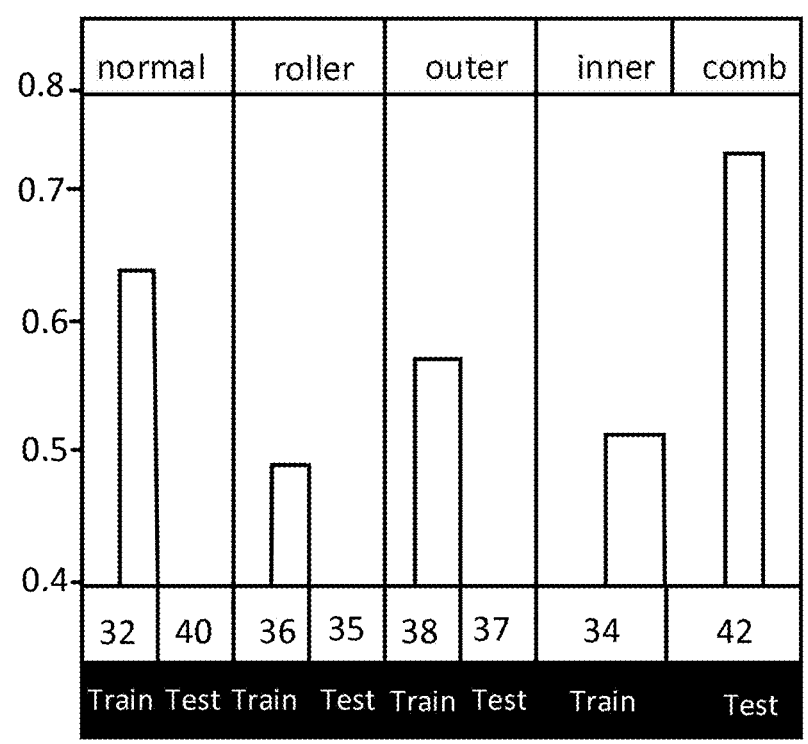
FIG. 15 is a comparison of the spectral peak stability coefficient features between the training group and the test group of the rolling bearing provided by an embodiment of the application.

The classification results are verified and compared with the mechanism analysis and feature engineering conclusions. The representative spectral peak stability coefficient in this example is selected to verify the feature alignment. From FIG. 15, it can be seen that the feature concentration trend and dispersion of each state in the test group and the training group are consistent, and other relevant features and redundant features may be used for analysis, and the conclusion is the same.

Figure 16:
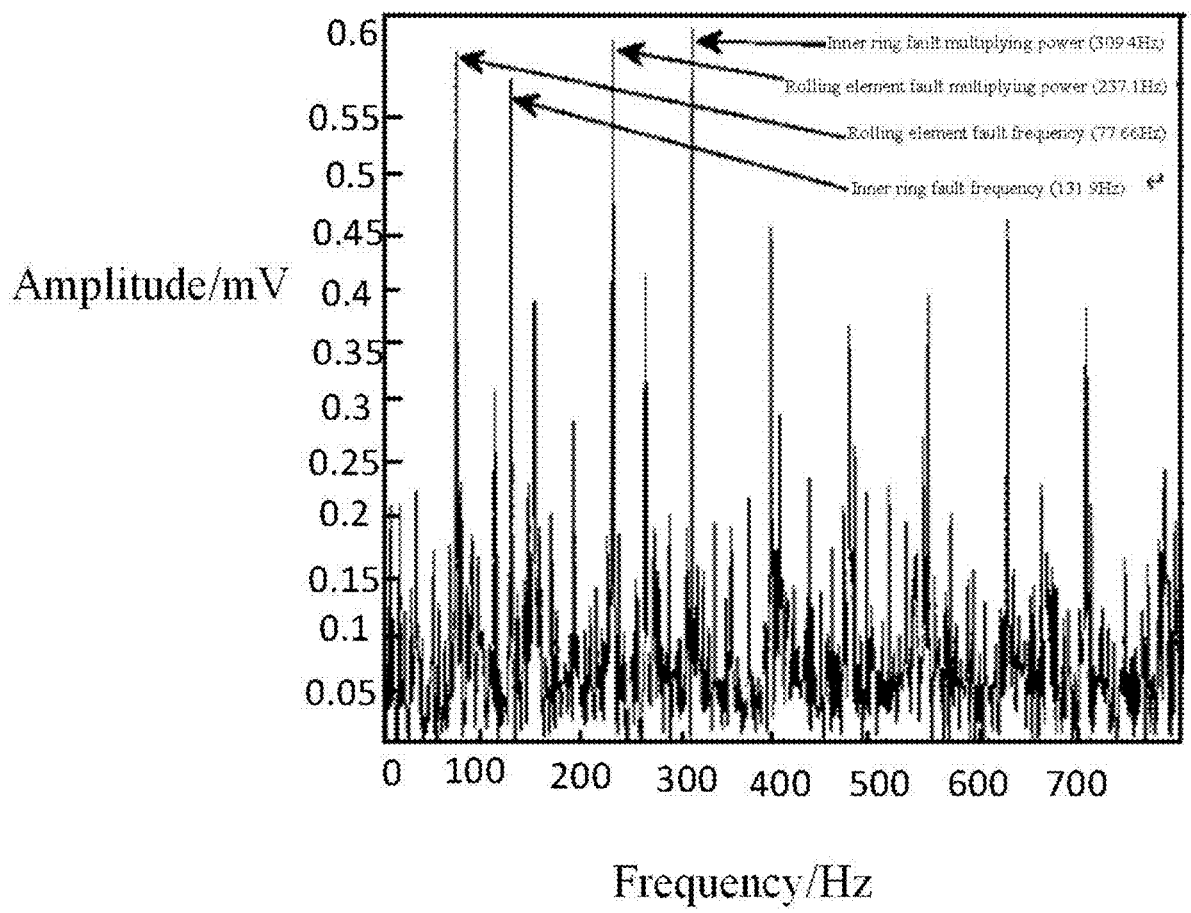
FIG. 16 is a fault state envelope diagram of verification analysis combination provided by an embodiment of the application.

The mechanism analysis of the combined fault of the unknown label shows that it has many fault features in a single state in the envelope spectrum. In this embodiment, the combined fault state of the rolling element and the inner ring is used for envelope analysis, and the envelope spectrum is shown in FIG. 16.

The fault frequency and the frequency doubling of the fault frequency peculiar to the inner ring and the fault frequency and the frequency doubling of the fault frequency peculiar to the rolling element may be clearly observed.

(4) Obtaining the final fault diagnosis result. The final fault diagnosis results are given by voting method, combining the results of KNN classification model, mechanism analysis and feature engineering. The results are consistent and unchanged, and the differences are determined by voting.

For the rolling bearing combined fault, the application aims at solving the problem that it is difficult to comprehensively discriminate the health state of the rolling bearing due to the features of diversity of faults, imbalance of strength and the like. The application selects time-domain and frequency-domain features of fault-sensitive vibration signals by using a distance evaluation technology, and combining the time-frequency features obtained by improved empirical mode decomposition to construct a multi-domain fault sample set; EEMD and kurtosis maximum criterion are used to analyze the fault mechanism, and the modulation features of each single fault are obtained. Then, feature engineering is carried out on the screened time-domain and frequency-domain features, and relevant features, redundant features are screened out. Unsupervised hierarchical clustering is carried out on the test set fault samples with unknown labels, and then the test set fault samples with unknown labels are input to KNN model for a training. Under the condition that the combined fault of the test set is unlabeled, the combined fault state of the recombination type of the rolling bearing is identified by using the known single fault data, and the results are scrutinized multiple times, which has high fault diagnosis accuracy.

The above-mentioned embodiments only describe the preferred mode of the application, and do not limit the scope of the application. Under the premise of not departing from the design spirit of the application, various modifications and improvements made by ordinary technicians in the field to the technical scheme of the application shall fall within the protection scope determined by the claims of the application.

What is claimed is:

1. A rolling bearing combined fault diagnosis method based on a multi-domain feature construction, comprising:
   collecting vibration signals of rolling bearings, extracting time-domain and frequency-domain features of fault-sensitive vibration signals of the rolling bearings by using a distance evaluation technology, and obtaining an in-domain feature set;
   performing an improved empirical mode decomposition on the vibration signals of the rolling bearings to obtain time-frequency features;
   constructing a multi-domain fault sample set based on the in-domain feature set and the time-frequency features;
   performing a fault mechanism analysis on the multi-domain fault sample set by using an Ensemble Empirical Mode Decomposition (EEMD) and a kurtosis maximum criterion to obtain modulation features under each single fault;
   carrying out a feature engineering on the time-domain and frequency-domain features, and screening out relevant features, redundant features and irrelevant features; and
   performing an unsupervised hierarchical clustering on test set fault samples with unknown labels, and then inputting into a K-Nearest Neighbors (KNN) model for a classification, and obtaining rolling bearing combined fault diagnosis results;
   wherein the performing of the fault mechanism analysis on the multi-domain fault sample set by using the EEMD and the kurtosis maximum criterion to obtain the modulation features under the single fault comprises:
   separating high-frequency components in the vibration signals of the rolling bearings from original signals by the EEMD, and selecting Intrinsic Mode Function (IMF) components obtained by an EEMD decomposition according to the kurtosis maximum criterion, and extracting fault frequencies and modulation features of each state under actual working conditions by an envelope demodulation;
   wherein the extracting of the fault frequencies and the modulation features of each state under the actual working conditions by the envelope demodulation comprises:
   performing the EEMD on the vibration signals of the rolling bearings to obtain a group of the IMF components with different frequency components and frequencies arranged in sequence from high to low;
   calculating a kurtosis value of each of the IMF components, selecting an IMF with a largest kurtosis value for the envelope demodulation, and obtaining envelope signals through a Hilbert transform; and
   performing a Fourier transform on the envelope signals to obtain an envelope spectrum of the envelope signals; based on the envelope spectrum, performing an envelope analysis on a high-frequency natural vibration, a rotating frequency and a frequency doubling thereof, a fault feature frequency and a frequency doubling thereof, and a rotating frequency and a frequency doubling sideband thereof existing in a fault feature frequency accessory, and obtaining correlation results between different fault states according to a feature frequency on the envelope spectrum;
   wherein the carrying out the feature engineering on the time-domain and frequency-domain features, and screening out the relevant features, the redundant features and the irrelevant features comprises:
   drawing a time-domain and frequency-domain feature box plot based on the in-domain feature set, and analyzing a concentration trend and a dispersion degree of each feature among the rolling bearings in different health states based on the time-domain and frequency-domain feature box plot; according to the concentration trend and the dispersion degree, performing a screening and obtaining the relevant features, the redundant features and the irrelevant features;
   wherein indicator conditions of each of rolling bearing states show that intervals are not overlapping with each other, upper and lower limits of each interval define an area independently, without comprising a same range with other state intervals, and spans a exist between defined areas of each interval, indicating the relevant features;
   the indicator conditions of some of the rolling bearing states show that the intervals are not overlapping each other, and spans exist among the intervals, indicating the redundant features;
   the indicator conditions of each of the rolling bearing states show that the intervals are overlapping each other or spans exist among the intervals but the spans are too small, indicating the irrelevant features;
   wherein the performing of the unsupervised hierarchical clustering on the test set fault samples with the unknown labels, and then inputting into the KNN model for the classification, and obtaining the rolling bearing combined fault diagnosis results comprises:
   importing a fault sample set of a training set with known labels into the KNN model, and dividing the training set by a 10-fold cross validation, and performing a parameter optimization design by a grid search method;

performing the unsupervised hierarchical clustering on the test set fault samples with the unknown labels, and determining an optimal number of clustering clusters according to an Elbow method and a scatter diagram, and importing the test set fault samples with the unknown labels into the KNN model for a testing, and then obtaining classification results; and verifying the classification results and comparing with a mechanism analysis and a feature engineering conclusion, and finally obtaining the rolling bearing combined fault diagnosis results with the unknown labels.

2. The rolling bearing combined fault diagnosis method based on the multi-domain feature construction according to claim 1, wherein the obtaining of the in-domain feature set and the time-frequency features, and constructing the multi-domain fault sample set based on the in-domain feature set and the time-frequency features comprises:

after collecting the vibration signals of the rolling bearings and performing a data preprocessing, calculating statistical features indicators of time-domain and frequency-domain, and selecting fault-sensitive indicators of the time-domain and frequency-domain statistical features according to the distance evaluation technology to form the in-domain feature set;

meanwhile, performing a wavelet threshold denoising on the vibration signals of the rolling bearings, and then performing the EEMD decomposition, and screening the IMF components according to a cross-correlation method, and constructing an energy matrix based on the IMF components, and performing a Singular Value Decomposition (SVD) to obtain Empirical Mode Decomposition-Singular Value Decomposition (EMD-SVD) features; and fusing the in-domain feature set and the EMD-SVD features through a Principal Component Analysis (PCA) dimensionality reduction, and obtaining the multi-domain fault sample set.

3. The rolling bearing combined fault diagnosis method based on the multi-domain feature construction according to claim 2, wherein the selecting of the fault-sensitive indicators of the time-domain and frequency-domain statistical features according to the distance evaluation technology to form the in-domain feature set comprises:

calculating the statistical features indicators of the time-domain and the frequency-domain respectively, arranging the statistical feature indicators in a descending order, and obtaining feature sets of various types of rolling bearing faults according to the distance evaluation technology based on feature parameters with the statistical feature indicators greater than or equal to preset thresholds;

wherein the statistical features indicators of the time-domain comprise an absolute mean value, a peak value, an effective value, a square root amplitude, a variance, a peak-peak value, a skewness, a kurtosis, a waveform factor, a pulse factor, a margin factor and a variation coefficient;

the statistical features indicators of the frequency-domain comprise a center of gravity frequency, a mean square frequency, a root mean square frequency, a frequency variance, a frequency standard deviation, a spectral peak stability index, a first frequency band relative energy, a second frequency band relative energy, a third frequency band relative energy, a fourth frequency band relative energy and a fifth frequency band relative energy.

4. The rolling bearing combined fault diagnosis method based on the multi-domain feature construction according to claim 1, wherein, single faults of the rolling bearings comprise an inner ring fault, an outer ring fault and a rolling element fault;

combined faults of the rolling bearings are formed by combining any two or more forms of the inner ring fault, the outer ring fault and the rolling element fault in the single faults;

the inner ring fault is modulated by high-frequency natural vibration signals, inner ring fault feature frequency signals and rotating frequency signals;

the outer ring fault is modulated by high-frequency natural vibration signals and outer ring fault feature frequency signals; and the rolling element fault is modulated by a feature frequency of the rolling element fault and a frequency doubling thereof, an associated vibration frequency and a frequency doubling with the associated vibration frequency being the rotating frequency.

* * * * *